United States Patent
Leong et al.

[11] Patent Number: 5,963,499
[45] Date of Patent: Oct. 5, 1999

[54] CASCADABLE MULTI-CHANNEL NETWORK MEMORY WITH DYNAMIC ALLOCATION

[75] Inventors: Raymond M. Leong, Los Altos; Derek Johnson, Los Gatos; Mathew R. Arcoleo, San Jose, all of Calif.

[73] Assignee: Cypress Semiconductor Corp., San Jose, Calif.

[21] Appl. No.: 09/018,758

[22] Filed: Feb. 5, 1998

[51] Int. Cl.$^6$ ........................................ G11C 8/00
[52] U.S. Cl. ................. 365/230.03; 365/49; 365/189.05
[58] Field of Search .................. 365/230.03, 230.01, 365/49, 189.05

[56] References Cited

U.S. PATENT DOCUMENTS

| | | | |
|---|---|---|---|
| 5,136,582 | 8/1992 | Firoozmand | 370/85.1 |
| 5,182,800 | 1/1993 | Farrell et al. | 395/425 |
| 5,251,303 | 10/1993 | Fogg, Jr. et al. | 395/275 |
| 5,313,582 | 5/1994 | Hendel et al. | 395/250 |
| 5,317,692 | 5/1994 | Ashton et al. | 395/200 |
| 5,396,470 | 3/1995 | Storn | 365/189.09 |
| 5,448,702 | 9/1995 | Garcia, Jr. et al. | 395/325 |
| 5,502,719 | 3/1996 | Grant et al. | 370/58.2 |
| 5,521,915 | 5/1996 | Dieudonne et al. | 370/60.1 |
| 5,528,588 | 6/1996 | Bennett et al. | 370/60 |
| 5,583,861 | 12/1996 | Holden | 370/395 |
| 5,619,646 | 4/1997 | Hoch et al. | 395/200.01 |

*Primary Examiner*—Huan Hoang
*Attorney, Agent, or Firm*—Christopher P. Maiorana, P.C.

[57] ABSTRACT

A memory array comprising a plurality of storage elements and a logic circuit. The memory array may be configured to (i) receive a plurality of input data streams, (ii) store each of the plurality of input data streams in one or more of the storage elements in response to a plurality of control signals and (iii) present a plurality of output data streams in response to the plurality of input data streams. The logic circuit may present the plurality of control signals in response to the fullness of each of the plurality of storage elements.

19 Claims, 6 Drawing Sheets

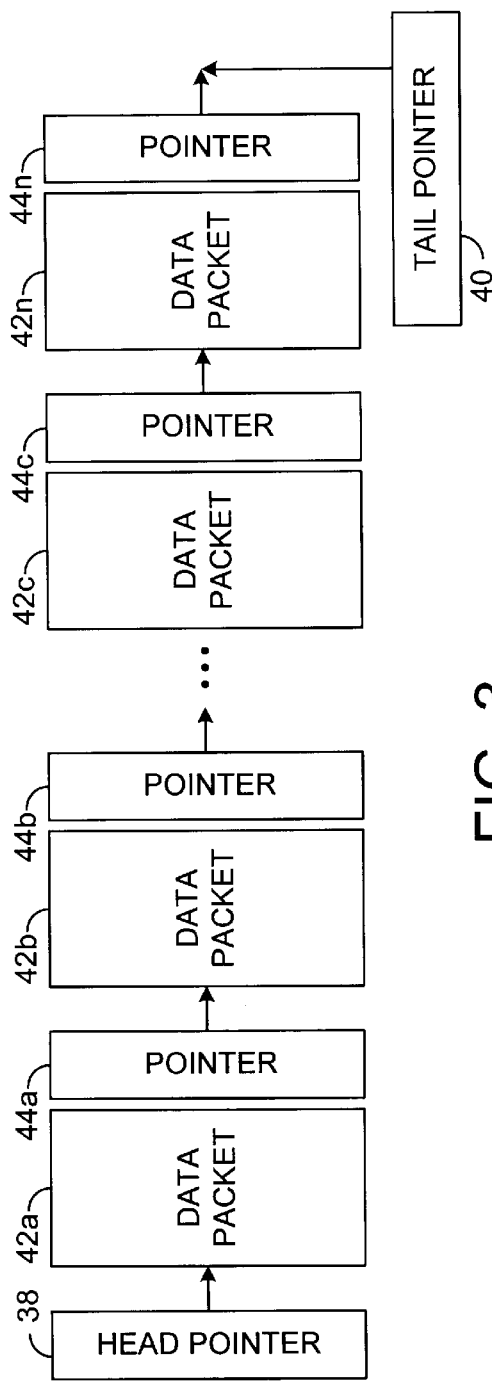
FIG. 3
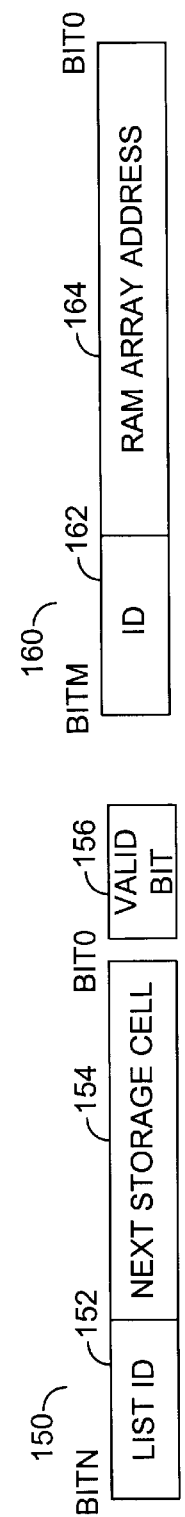
FIG. 9
FIG. 8

CASCADABLE MULTI-CHANNEL NETWORK MEMORY WITH DYNAMIC ALLOCATION

FIELD OF THE INVENTION

The present invention relates to memories generally and, more particularly, to a cascadable multi-channel memory with dynamic allocation suitable for use in a network environment.

BACKGROUND OF THE INVENTION

Buffers are used in a variety of applications where it is desirable to connect devices that are operating at different speeds, transfer rates and/or frequencies. In particular applications, such as a network environment, a number of buffers may have to be implemented for each of a number of separate channels in a particular network system. When first-in first-out (FIFO) buffers are implemented for each channel, the overall expense in increasing the depth of the buffers (i.e., each of the FIFOs) may result in device inefficiency.

An alternate implementation for a multi-channel memory may be to implement static random access memories (SRAMs) as the data buffers. An SRAM based buffer implementation requires a controller to maintain multiple software linked-lists of the entry stored for each of the channels that are stored in each of the SRAMs. The FIFO implementation also requires an intelligent controller to orchestrate the reading and writing of the channel buffers.

Since FIFO buffers are generally expensive, increasing the buffer size by adding more FIFO depth may not be cost effective. While the SRAM approach may be cheaper, increasing the overall buffer size by adding more SRAM devices may require a corresponding increase in the size of the linked-list in the controller unit. Furthermore, the memory assigned to each data buffer channel is fixed so sharing of unused storage capacity among the individual channels is not possible.

SUMMARY OF THE INVENTION

The present invention concerns a memory array comprising a plurality of storage elements and a logic circuit. The memory array may be configured to (i) receive a plurality of input data streams, (ii) store each of the plurality of input data streams in one or more of the storage elements in response to a plurality of control signals and (iii) present a plurality of output data streams in response to the plurality of input data streams. The logic circuit may present the plurality of control signals in response to the fullness of each of the plurality of storage elements.

The objects, features and advantages of the present invention include providing a RAM configuration that (i) integrates both the buffer storage and the linked-list logic on a single chip, (ii) simplifies the design of the controller unit by using one controller to control more than one linked-list, (iii) provides flexibility in increasing the overall and individual buffer depths, (iv) provides high performance buffering, (v) supports multiple channels on one device, and (vi) provides an overall cost effective solution to a multi-channel network buffer.

BRIEF DESCRIPTION OF THE DRAWINGS

These and other objects, features and advantages of the present invention will be apparent from the following detailed description and the appended claims and drawings in which:

FIG. 3 is a block diagram of a linked-list based channel;

FIG. 8 is a diagram of a typical tag entry; and

FIG. 9 is a diagram of a typical head pointer register.

DETAILED DESCRIPTION OF THE PREFERRED EMBODIMENTS

Figure 1:
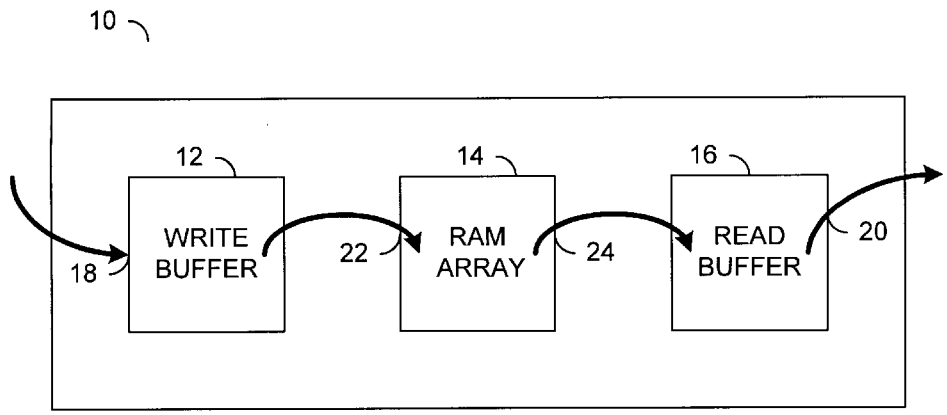
FIG. 1 is a block diagram of an overall architecture of the present invention.

Referring to FIG. 1, a circuit 10 is shown in accordance with a preferred embodiment of the present invention. The circuit generally comprises a write buffer 12, a RAM array 14 and a read buffer 16. The write buffer 12 generally receives an input data stream (e.g., DataIn) at an input 18. The write buffer generally presents information to the RAM array 14. The read buffer generally retrieves the information from the RAM array 14 and presents the information at an output 20. The output 20 may present an output data stream (e.g., DataOut). The input data stream DataIn and the output data stream DataOut may each be multibit signals that represent various channels of information to be independently stored in the RAM array 14. The write buffer 12 generally presents information to an input 22 of the RAM array 14, while the read buffer 16 generally reads information from an output 24 of the RAM array 14.

Figure 2:
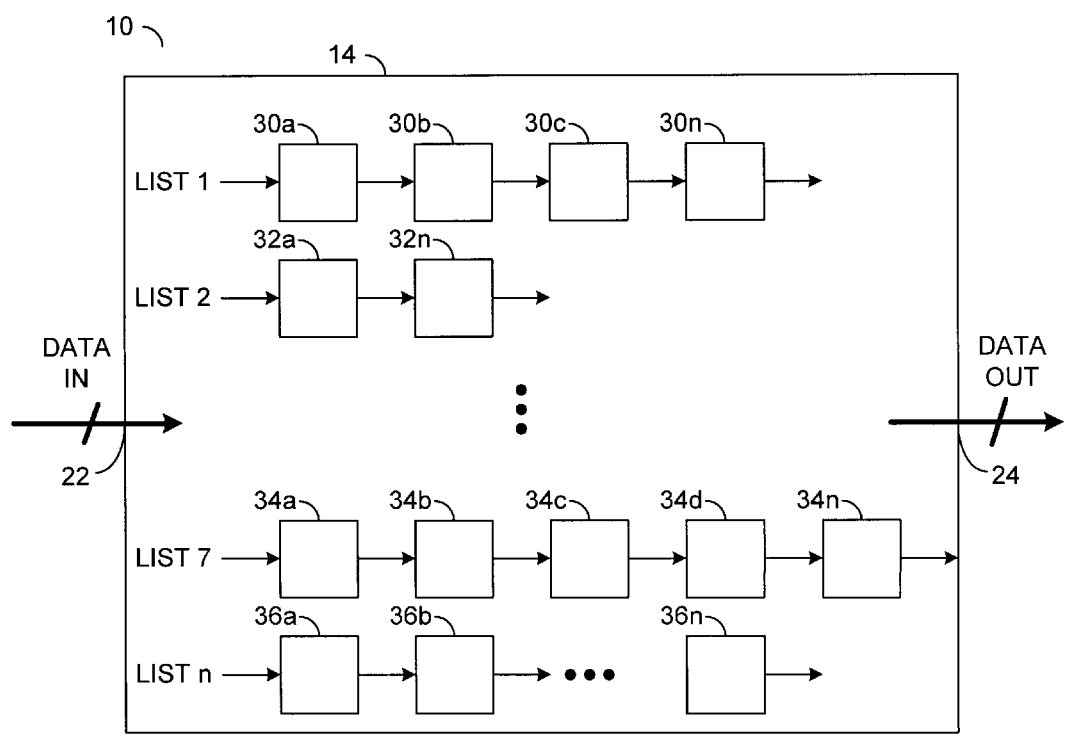
FIG. 2 is a more detailed block diagram showing a number of internal channels of the present invention.

Referring to FIG. 2, a more detailed block diagram of the circuit 10 is shown. The RAM array 14 is shown comprising a number of internal channels (e.g., List1-Listn). The channel List1 may comprise data received at the input 22 that may be stored at a number of cells (or storage elements) 30a–30n. Additional channels may be stored in the List2-Listn that each comprise a number of cells (or storage elements) for storing information. For example, the List2 may comprise a number of cells (or storage elements) 32a–32n, the List7 may comprise a number of cells (or storage elements) 34a–34n, and the Listn generally comprises a number of cells (or storage elements) 36a–36n.

Each cell has an associated "TAG" entry (to be described in more detail in connection with FIG. 8) which contains the list ID number of the cell, the valid cell bit, and the pointer to the next cell in the same list. The valid cell bit indicates that the cell is currently in use (and therefore not free to be allocated).

The cells 30a–30n, 32a–32n, 34a–34n and 36a–36n may be implemented as cells selected from a pool of free cells of the RAM array 14. While the cells 30a–36n are shown implemented sequentially from left to right for each linked-list, the particular implementation of the writing to the RAM array 14 may allow for non-sequential writing to the particular elements 30a–36n (to be described in more detail in connection with FIGS. 4–6).

Referring to FIG. 3, an example of a particular linked-list is shown. Each linked-list List1-Listn generally comprises an associated head pointer 38 and tail pointer 40. The head pointer 38 generally points to the first data cell of the linked-list and the tail pointer 40 generally points to the last cell in the linked-list. A number of storage cells 42a–42n may be associated with a number of next address pointers 44a–44n that each point to a particular location in RAM array 14 where the next storage cell in that particular linked-list is stored. During a list read operation, the storage cell in RAM array 14 addressed by the head pointer 38 may be accessed. The head pointer 38 may then be loaded with the address in the "next address pointer field" (e.g., the address associated with the current cell 30a–36n in preparation for the next read). During a write, the RAM array 14 generally appends a new storage cell to the end of the linked-list by placing the address of the new cell into the "next address pointer" field associated with the last cell in the linked-list. This makes the new cell the last cell in the buffer chain.

New memory cells that may be needed to store write data received from the external logic may be selected from the available free cells. During each write cycle, a logic circuit (to be described in more detail in connection with FIG. 5) may scan the entire valid bit array 105 in the tag 104 looking for a memory cell in RAM array 14 with an associate cleared valid bit. Once located, the free memory cell may be used to store the new information. Since each memory cell is generally available to each of the individual channels List1-Listn, the size of each linked-list may be different and independently variable. Specifically, the size of the independent linked-lists may grow or shrink dynamically until all of available memory cells in RAM array 14 are used.

In one embodiment, the valid bit array 105 in the tag 104 may be implemented as a CAM (content addressable memory) such that the search for the free memory cells may be performed simultaneously as opposed to sequentially. As a result, the overall performance of the circuit 10 may be increased.

The logic generally returns a memory cell to the "free cell pool" (i.e., the cells with an associated cleared valid bit) by clearing the valid bit after the contents of the memory cell have been read by the external logic. In one example, the content of a memory cell may be preserved after a read if a non-destructive read signal is implemented and asserted during the read operation. In one example, the logic may keep the valid bit of the particular cell addressed by head pointer 38 unchanged.

Figure 4:
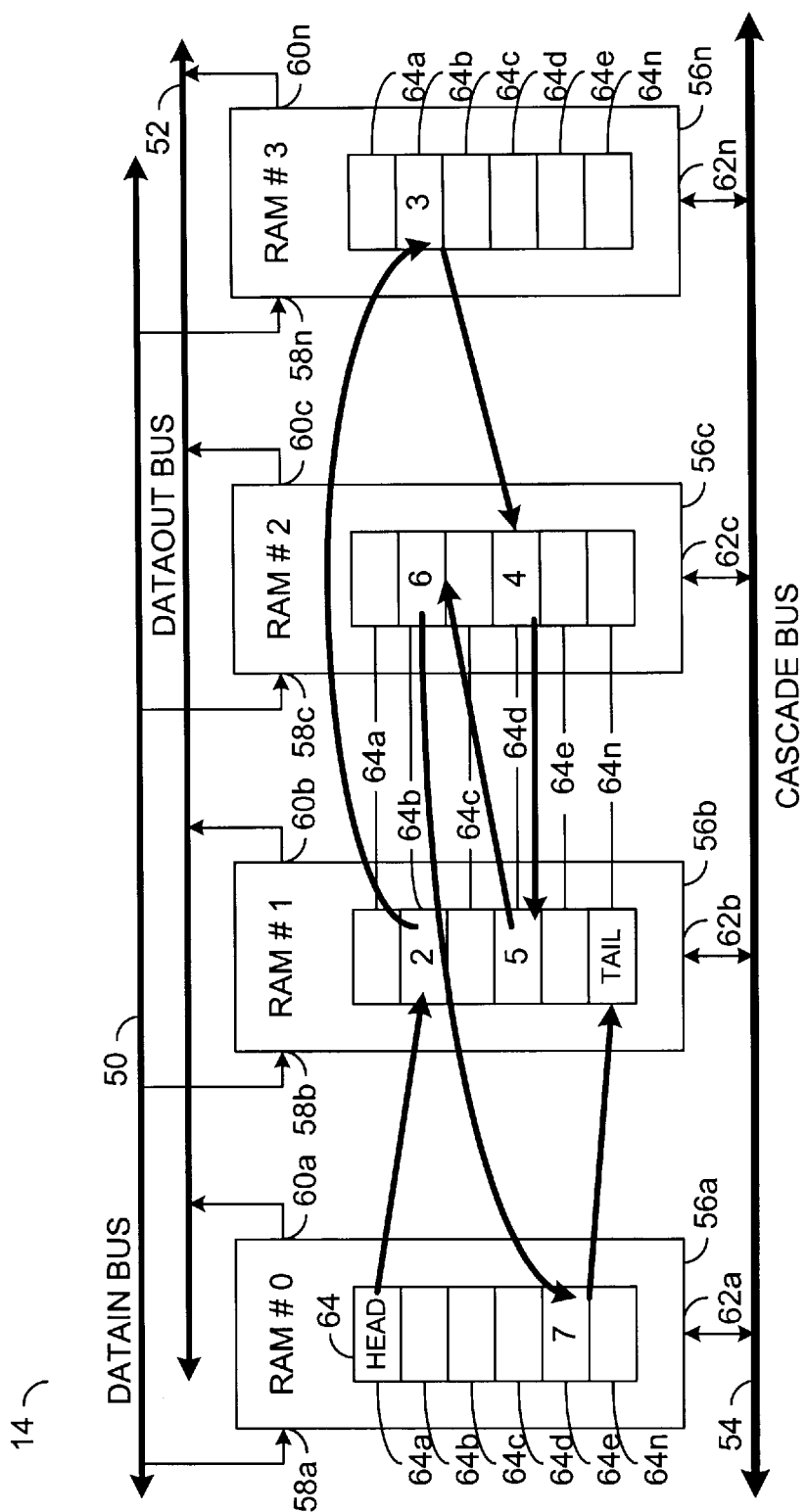
FIG. 4 is a block diagram illustrating an implementation of the present invention where data in a particular channel may be stored in more than one RAM bank.

Referring to FIG. 4, a more detailed block diagram of a particular linked-list (e.g., List1-Listn) is shown where the information is stored in a number of particular RAM elements. The RAM array 14 is shown having an input bus (e.g, a DataIn bus) 50, an output bus (e.g., a DataOut bus) 52, a cascade bus 54 and a number of discrete RAMs 56a–56n. The DataIn bus 50 may present a signal to a number of inputs 58a–58n of each of the RAM blocks 56a–56n. In addition, a number of outputs 60a–60n may present information to the DataOut bus 52. The cascade bus 54 may be connected to each of the RAM blocks 56a-56n through a number of inputs/outputs 62a–62n. Each of the discrete RAM blocks 56a–56n generally comprises the circuit 10 shown in FIG. 5.

A flow of a particular linked-list is shown starting at the cell 64a of the RAM block 56a. The linked-list then progresses to the cell 64b of the RAM block 56b, the cell 64b of the RAM block 56n, the cell 64d of the RAM block 56c, the cell 64d of the RAM block 56b, the cell 64b of the RAM block 56c, and to the cell 64e of the RAM block 56a. Finally, the last storage element of the linked-list may be stored in the cell 64n of the RAM block 64b. As a result of the flexible storage of each of the linked-lists List1-Listn, each storage element of the list may be distributed over the various discrete RAM blocks 56b–56n. The length of each list may be varied (e.g., either expanded or contracted) to fit the data flow requirement of a particular application.

When a read is performed on a number of RAM blocks 56a–56n cascaded together, only the RAM block 56a–56n which contains the head element will respond by bursting data onto the DataOut bus 52. The RAM block 56a–56n which is presenting data will also access the tag entry corresponding to the head pointer storage cell in order to get the next pointer address information (e.g., the address and RAMID of the next storage cell). The RAM block 56a–56n providing data will then broadcast (via the cascade bus 54) the next pointer and the RAMID information stored in the head pointer storage cell to all RAM blocks 56a–56n in the cascade and assert a broadcast-new-head signal.

Upon sensing the assertion of broadcast-new-head signal, all RAM blocks 56a–56n in the cascade will generally update their associated head pointer registers (e.g., corresponding to the list which is being read) with the information on the cascade bus 54. Thus, the "next pointer" storage cell for the current head pointer becomes the new head storage cell.

During a write to a number of RAM blocks 56a–56n cascaded together, the RAM block 56a–56n which stores the tail pointer element will respond by (i) reading information in the DataIn bus 50, (ii) storing the information in a write buffer, and (iii) subsequently writing the information into the RAM array 14. Next, the selected RAM block 56a–56n will inform all of the other RAM blocks 56a–56n in the cascade that the next free location information is on the cascade bus 54 and re-assert the get-next-tail signal. Each of the RAM blocks 56a–56n will generally update the tail pointer register, (e.g., the list being written) with the information on the cascade bus 54.

A final valid bit search may be initiated by the RAM block 56a–56n being written to by a third assertion of the get-next-tail signal. This subsequent search may ensure that there is not a full condition (e.g., there are no more free storage cells). If a full condition occurs, an array full may be signaled and no further writes are allowed until the full condition is removed (e.g., by a subsequent read).

Figure 5:
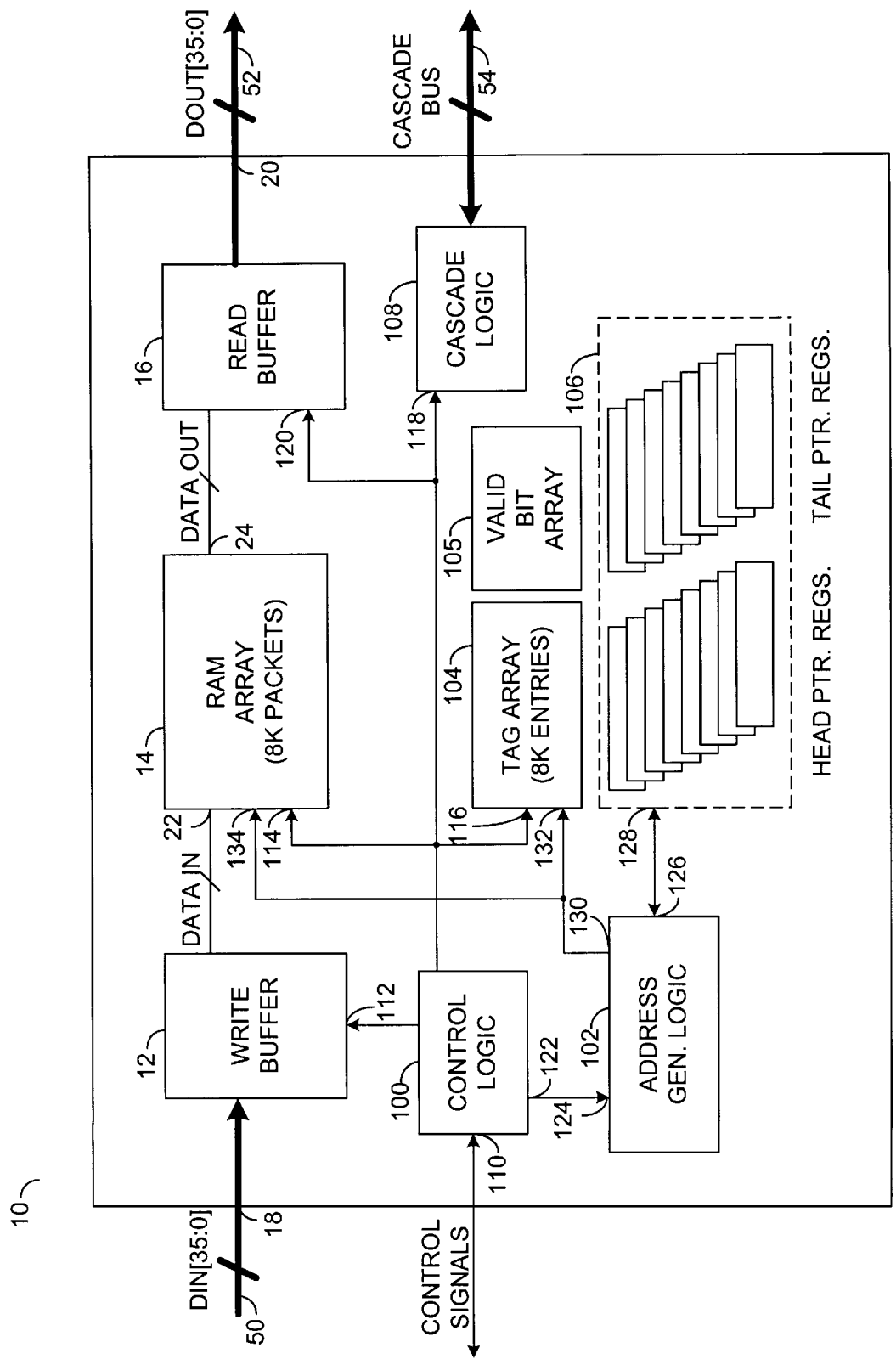
FIG. 5 is a block diagram of the overall architecture of a preferred embodiment of the present invention.

Referring to FIG. 5, a more detailed diagram of the circuit 10 is shown. The write buffer 12, the RAM array 14 and the read buffer 16 are shown along with additional supporting circuitry. The supporting circuitry generally comprises a control logic block (or circuit) 100, an address generation logic block (or circuit) 102, a tag array block (or circuit) 104, a pointer block (or circuit) 106, and a cascade logic block (or circuit) 108.

The control logic block 100 generally comprises an input 110 that may receive external control signals. The control logic block 100 may present control information to an input 112 of the write buffer 12, an input 114 of the RAM array 14, an input 116 of the tag array 104, an input 118 of the cascade logic block 108 and to an input 120 of the read buffer 116. The control logic 100 also has an output 122 that may present information to an input 124 of the address generation logic block 102. The address generation logic block 102 comprises an output 126 that may present information to an input/output 128 of the pointer registers 106. The address generation logic block 102 also has an output 130 that may present information to an input 132 of the tag array 104 as well as to an input 134 of the RAM array 14.

The tag array 104 may be used to store the "next address" pointer fields associated with storage cells in RAM array 14.

The "next address" pointers may be used to link the storage cells in a particular linked-list. When a particular piece of data is to be retrieved from the list n, the RAMID field in list n's head pointer is compared to the current RAM's unique positional ID. If the head pointer ID matches the RAM's ID, an "array hit" occurs and the data may be retrieved from the RAM array 14.

The circuit 10 may be configured to handle a number of packets depending on how many discrete RAM blocks are cascaded together. In one example, 8K packets may be stored in all of the RAM blocks of a cascade. However, other numbers of packets may be implemented to meet the design criteria of a particular application. Additionally, the size of the individual packets may be adjusted. Examples of particular packet sizes may include a 64-byte packet, a 53-byte packet (that may be appropriate in an asynchronous transfer mode (ATM) application) and other user selected packet sizes. Additionally, parity/ECC/extra storage bits may be provided (e.g., 9 bits may be used to store 1 byte of data and 1 bit for byte parity).

Figure 6:
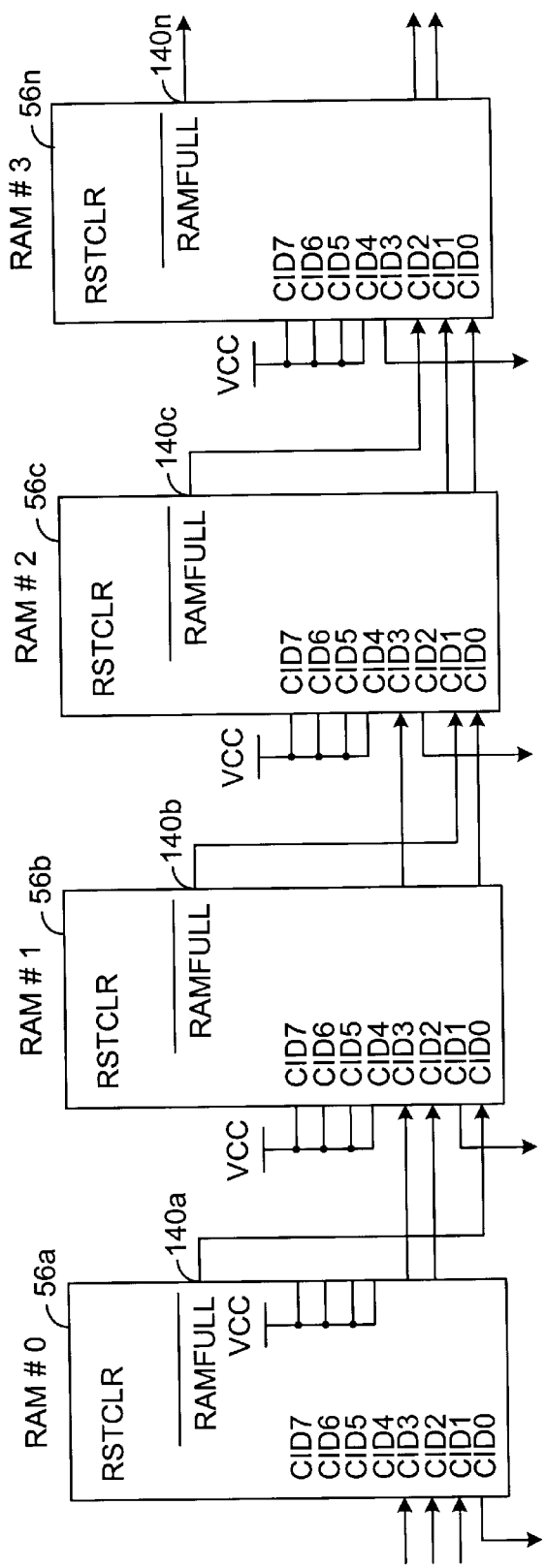
FIG. 6 is a block diagram illustrating the various select signals implemented in a number of RAM elements.

Referring to FIG. 6, an example of the implementation of four RAM blocks 56a–56n is shown. Each of the RAM blocks 56a–56n is shown comprising a number of inputs (e.g., inputs CID0–CID7), and an output 140a–140n. The inputs CID0–CID3 are generally connected to a supply voltage VCC or ground to configure a particular device ID of the RAM block 56a–56n. The device ID may be used to allow all of the RAM blocks in a cascade to store the appropriate RAM_ID for the head and tail pointer registers. Generally, when a RAM_ID match occurs on a read, the particular RAM 56a–56n generally respond (and likewise on a write).

Figure 7:
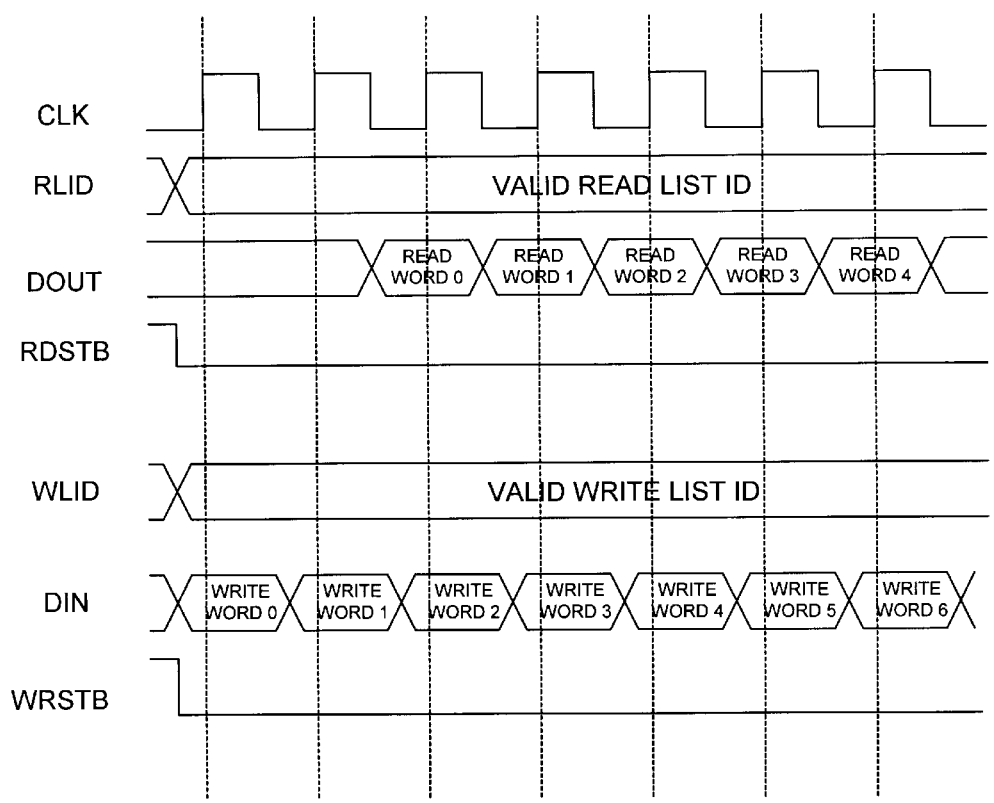
FIG. 7 is a timing diagram of a preferred embodiment of the present invention.

Referring to FIG. 7, a timing diagram of the circuit 10 is shown. The timing diagram generally comprises a clock signal (e.g., CLK), a valid read list ID signal (e.g., RLID), the set of signals DataOut, a read strobe signal (e.g., RDSTB), a valid write list ID signal (e.g., WLID), the set of signals DataIn, and a write strobe signal (e.g., WRSTB). The set of signals DataOut are generally presented when the read strobe signal is asserted. Additionally, the set of DataIn signals are generally read when the write strobe signal WRSTB is asserted.

Referring to FIG. 8, a tag entry 150 is shown. The tag entry 150 generally comprises a list ID portion 152, a next storage cell portion 154 and a valid bit portion 156. The list ID portion 152 generally stores an address location of the corresponding storage cell. The pointer portion 154 generally stores the address location of the next storage cell (e.g., the RAM array address and the RAM ID). The valid bit portion 156 generally provides a digital signal that may be either asserted or deasserted depending on the availability of the particular location.

Referring to FIG. 9, a diagram of a head pointer register is shown. The register 160 generally comprises an ID portion 162 and an address portion 164. The ID portion 162 generally stores an address pointing to the location of storing the storage cell of the head pointer. The address portion 164 generally stores a RAM address where the head pointer storage cell is located. The head pointer register 160 is generally implemented for each of the lists List1-Listn. A similar register 160' may be implemented for a tail pointer register.

Referring back to FIG. 5, the control logic block 100 may provide control of data transfers on the DIN Bus 50 and the Dout Bus 52. The control logic block 100 may receive inputs from the signal Read List ID (RLID), the signal Write List ID (WLID), the signal Read Strobe (RDSTB), the signal Write Strobe (WRSTB), and the clock signals.

The address generation logic block 102 may provide address information to the internal RAM array 14 and the tag array 132. The cascade logic 108 may control the transfer of the head and tail pointer information between discrete RAM blocks 56a–56n that are cascaded together.

If a read to list W occurs (e.g., where RLID=W, and RDSTB is active), the control logic 100 generally passes information to the address generation logic 102 indicating that a read from list W is desired. The address generation logic 102 may access the list W's head pointer register 106. The RAM ID field 162 of list W's head pointer register 160 is generally compared to the RAM's positional ID. If there is a match, the RAM array address field 164 is generally presented to both the RAM array 14 and the tag array 132. The address generation block 102 generally provides the RAM array address for every element in a burst by incrementing the base address for each element in the head storage cell. The cascade logic 108 will generally broadcast the next storage cell field of the tag 154 on the cascade bus 54 which may allow all of the discrete RAM blocks 56a–56n in the cascade to update their list W head pointer registers 106.

If a write to list V occurs (e.g., where WLID=V, and WRSTB is active), the control logic 100 generally passes information to the address generation logic 102 indicating that a write to list V is desired. The address generation logic 102 may access list V's tail pointer register 106. The RAM ID field 162 of list V's tail pointer register is generally compared to the RAM's positional ID. If there is a match, the RAM array address field 164 is generally presented to both the RAM array 14 and the tag array 132. The address generation block 102 may then provide the RAM array address for every element in a burst by incrementing the base address for every element in the tail storage cell. The cascade logic 108 generally initiates a free cell search to all RAM blocks 56a–56n in the cascade. The highest priority RAM that contains a free cell will generally issue the RAM ID and address of the free cell on the cascade bus 54 such that all of the RAM blocks 56a–56n in the cascade may update their V tail pointer registers 106. The cascade logic 108 will then initiate another free cell search so that all full RAM blocks 56a–56n issue a full signal to all other RAM blocks 56a–56n in the array. In one aspect of the invention, the write buffer 12 may be implemented to store the write data while a concurrent read transaction is occurring.

In general, if a match does not occur between the RAM's positional ID and the RAM ID field 162 (i.e., the list's head pointer register 160 for a read or tail pointer register 160' for a write), the array access does not generally occur and only cascade bus 108 requests are responded to by the particular RAM block 56a–56n.

While the invention has been particularly shown and described with reference to the preferred embodiments thereof, it will be understood by those skilled in the art that various changes in form and details may be made without departing from the spirit and scope of the invention.

We claim:

1. A circuit comprising:
   a memory array comprising a plurality of storage elements, said memory array configured to (i) receive a plurality of input data streams, (ii) store each of said plurality of input data streams in one or more of said storage elements in response to a plurality of control signals and (iii) present a plurality of output data streams in response to said plurality of input data streams; and a logic circuit configured to present said plurality of control signals in response to the fullness of each of said plurality of storage elements.

2. The circuit according to claim 1, wherein each of said input data streams has a uniform packet size.

3. The circuit according to claim 1, wherein each of said data streams has a variable packet size.

4. The circuit according to claim 1, wherein said plurality of control signals comprise one or more link lists.

5. The circuit according to claim 1, wherein said plurality of control signals comprise one or more tag entries.

6. The circuit according to claim 1, wherein said plurality of control signals comprise one or more head pointers.

7. The circuit according to claim 1, wherein the fullness of each of said plurality of storage elements is determined simultaneously.

8. The circuit according to claim 7, wherein each of said storage elements further includes a content addressable memory cell configured to provide an indication signal to determine the fullness of each of said storage elements.

9. The circuit according to claim 1, wherein said memory array comprises one or more memory blocks, wherein each of said memory blocks contains one or more of said plurality of storage elements.

10. The circuit according to claim 9, wherein said plurality of input data streams are stored in one or more of said elements located in a plurality of said memory blocks.

11. The circuit according to claim 9, wherein each of said memory blocks has a uniform size.

12. The circuit according to claim 9, wherein each of said memory blocks has a non-uniform size.

13. A circuit comprising:
    means for storing and retrieving information comprising a plurality of storage elements, said storage means for (i) receiving a plurality of input data streams, (ii) storing each of said plurality of input data streams in one or more of said storage elements in response to a plurality of control signals and (iii) presenting a plurality of output data streams in response to said plurality of input data streams; and means for presenting said plurality of control signals in response to the fullness of each of said plurality of storage elements.

14. A method for storing and retrieving information comprising the steps of:
    (a) receiving a plurality of input data streams;
    (b) storing said each of plurality of input data streams in one or more storage elements in response to a plurality of control signals;
    (c) generating said plurality of control signals in response to the fullness of each of said plurality of storage elements; and
    (d) presenting a plurality of output data streams in response to said plurality of input data streams.

15. The method according to claim 14, wherein step (b) further comprises the step of:
    (b-1) independently varying the size of each of said data streams.

16. The method according to claim 14, wherein step (c), further comprises the step of:
    (c-1) simultaneously checking the fullness of each of said plurality of storage elements.

17. The method according to claim 14, wherein said plurality of control signals comprise one or more link lists.

18. The method according to claim 14, wherein said plurality of control signals comprise one or more tag entries.

19. The method according to claim 14, wherein said plurality of control signals comprise one or more head pointers.

* * * * *